United States Patent [19]

Smith et al.

[11] Patent Number: 5,275,831
[45] Date of Patent: Jan. 4, 1994

[54] REDUCED FAT, READY-TO-EAT CEREAL

[75] Inventors: John J. Smith, Hoffman Estates; Robert J. Meschewski, Lake In The Hills, both of Ill.

[73] Assignee: The Quaker Oats Company, Chicago, Ill.

[21] Appl. No.: 901,442

[22] Filed: Jun. 19, 1992

[51] Int. Cl.$^5$ ............................ A23L 1/42; A23L 1/29; A23L 1/05

[52] U.S. Cl. ................................ 426/93; 426/21; 426/20; 426/44; 426/52; 426/94; 426/289; 426/302; 426/618; 426/619; 426/620; 426/621

[58] Field of Search ............... 426/93, 94, 289, 302, 426/618, 619, 620, 621, 44, 52, 20, 21

[56] References Cited

U.S. PATENT DOCUMENTS

| | | | |
|---|---|---|---|
| 3,876,811 | 4/1975 | Bonner et al. | 426/93 |
| 4,451,488 | 5/1984 | Cook et al. | 426/89 |
| 4,497,840 | 2/1985 | Gould et al. | 426/620 |
| 4,565,702 | 1/1986 | Morley et al. | 426/302 |
| 4,913,919 | 4/1990 | Cornwell et al. | 426/302 |
| 4,996,063 | 2/1991 | Inglett | 426/21 |
| 5,024,996 | 6/1991 | Ringe | 426/621 |
| 5,082,673 | 1/1992 | Inglett | 426/21 |
| 5,151,283 | 9/1992 | Foehse et al. | 426/621 |

Primary Examiner—Jeanette Hunter
Assistant Examiner—Mary S. Mims
Attorney, Agent, or Firm—Mart C. Matthews; Lars S. Johnson

[57] ABSTRACT

The present invention relates to a reduced fat, ready-to-eat cereal ingredients, said cereal comprising: a base component and a coating component thereon, said base component comprising from about 30 parts to about 90 parts by weight cereal flakes and from 0 parts to about 10 parts by weight milk solids; said coating component comprising from about 5 parts to about 60 parts by weight sugar, from about 1 part to about 10 parts by weight water-soluble dietary fiber composition, from about ½ part to about 5 parts by weight of a sugar solution, and sufficient water to make the coating component liquid. The present invention further comprises a process for preparing such a reduced fat, ready-to-eat cereal.

23 Claims, No Drawings

REDUCED FAT, READY-TO-EAT CEREAL

FIELD OF INVENTION

The present invention relates to a reduced fat, ready-to-eat cereal product, preferably prepared from natural ingredients.

BACKGROUND OF INVENTION

Many ready-to-eat cereals have been developed and sold in recent years. These cereals all have different types of additives which provide for prevention of staling and prevention of oxidation, as well as preservation of the product. Few cereals have been developed which are substantially free of these additives and preservatives. Likewise, few cereals have been developed which have not been subjected to substantial types of processing which significantly alters the product. The few ready-to-eat cereal products that have been developed which are prepared from natural ingredients and are subjected to minimal processing are desirable products. In addition, these ready-to-eat cereal products would be even more desirable if they contained reduced fat levels.

However, in such cereals, fat is typically added in the form of oil, which serves to keep the cereal product tender and helps to extend the cereal's bowl life in milk. When the oil is not added, or is replaced with water and sugar syrup, the resulting cereal becomes extremely hard and brittle and is not accepted as well by consumers. In the present invention, however, when the water-soluble dietary fiber of the present invention is added to such cereal products as a replacement for such oils, it has been surprisingly found that a reduced fat, ready-to-eat cereal product, preferably prepared from natural ingredients, can be prepared without any of the aforementioned undesirable effects.

BACKGROUND ART

A natural, ready-to-eat cereal similar to the preferred type prepared in the present invention is known. U.S. Pat. No. 3,876,811, issued Apr. 8, 1976 to Bonner et al., teaches a ready-to-eat cereal of natural ingredients, said cereal comprising a base and a coating thereon, said base comprising cereal flakes, coconut, milk solids, and edible nuts and said coating comprising brown sugar, non-hydrogenated vegetable oil, and a sugar solution. The cereal has a density in the range of from about 0.25 to about 0.60 gram per cubic centimeter and a moisture content in the range of from about 1.0 to about 3.5 percent by weight. However, this cereal also contains oil, which is added to keep the cereal product tender and extend the cereal's bowl life in milk.

A process for preparing water-soluble dietary fiber compositions from oats is also known to those skilled in the art. U.S. Pat. No. 4,996,063, issued Feb. 26, 1991 to Inglett, teaches preparing water-soluble dietary fiber compositions by treating an aqueous dispersion of a gelatinized, milled, oat substrate with an alpha-amylase under conditions which will hydrolyze the substrate and yield a soluble fraction and an insoluble fraction, separating said soluble fraction from said insoluble fraction, and recovering from said soluble fraction said water-soluble dietary fiber substantially free of waterinsoluble fiber.

However, neither of these references teach or suggest that the water-soluble dietary fiber prepared in accordance with the process of the '063 patent would be useful to partially or totally replace the oil in the cereal product described in the '811 patent, nor that such replacement would provide a product having the desired lower fat content, yet still provide a cereal having a texture and bowl life similar to that of the cereal of the '811 patent.

It is therefore an object of the present invention to provide a reduced fat, ready-to-eat cereal having texture and bowl life properties similar to those of the oil-containing cereal described in the '811 patent.

It is another object of the present invention to provide a process for preparing the reduced fat, preferably natural, ready-to-eat cereal products of the present invention.

These objects are accomplished by the invention described herein.

SUMMARY OF THE INVENTION

The present invention relates to a reduced fat, ready-to-eat cereal, preferably prepared from natural ingredients, said cereal comprising: a base component and a coating component thereon, said base component comprising from about 30 parts to about 90 parts by weight cereal flakes and from 0 parts to about 10 parts by weight milk solids; said coating component comprising from about 5 parts to about 60 parts by weight sugar, from about 1 part to about 10 parts by weight water-soluble dietary fiber composition, from about ½ part to about 5 parts by weight of a sugar solution, and sufficient water to make the coating component liquid.

The present invention further comprises a process for preparing a reduced fat, ready-to-eat cereal, said process comprising:

a. preparing a base component by admixing from about 30 parts to about 90 parts by weight cereal flakes with from 0 parts to about 10 parts by weight milk solids;

b. preparing a coating component by admixing from about 5 parts to about 60 parts by weight sugar, from about 1 part to about 10 parts by weight water-soluble dietary fiber composition, from about ½ part to about 5 parts by weight of a sugar solution, and sufficient water to make the coating component liquid;

c. heating the coating component to a temperature of from about 60° C. to about 70° C.;

d. enrobing the coating component onto the base component; and e. drying the enrobed base component to below about 3.5 percent by weight moisture.

DETAILED DESCRIPTION OF THE INVENTION

The present invention relates to a reduced fat, ready-to-eat cereal, preferably prepared from natural ingredients. The ready-to-eat cereal comprises a base component and a coating component thereon. The base component comprises from about 30 parts to about 90 parts, preferably from about 50 parts to about 80 parts by weight cereal flakes and from 0 parts to about 10 parts, preferably from about 3 parts to about 9 parts by weight milk solids. The base component preferably also contains from about 5 parts to about 10 parts, more preferably from about 8 parts to about 10 parts by weight coconut and/or from about 0.05 part to about 1.0 part, more preferably from about 0.5 part to about 0.8 part by weight coconut flavor, preferably natural, and from about 2 parts to about 9 parts, more preferably from about 3 parts to about 5 parts by weight edible nuts. The coating component comprises from about 5 parts to about 60 parts, preferably from about 30 parts to about 50 parts by weight sugar, more preferably brown sugar, from about 1 part to about 10 parts, preferably from about 4 parts to about 8 parts by weight water-soluble dietary fiber composition, from about ½ part to about 5 parts, preferably from about 2 parts to about 4 parts by weight of a sugar solution, and sufficient water to make the coating component liquid. The ready-to-eat cereal product typically comprises from about 35 parts to about 80 parts, preferably from about 50 parts to about 75 parts, more preferably from about 60 parts to about 70 parts by weight base component, and from about 20 parts to about 65 parts, preferably from about 25 parts to about 50 parts, more preferably from about 30 parts to about 40 parts by weight coating component.

The ready-to-eat cereal product of the present invention typically has a density in the range of from about 0.25 to about 0.60, preferably from about 0.28 to about 0.55, more preferably from about 0.40 to about 0.47 gram per cubic centimeter.

The base component of the cereal product of the present invention comprises cereal flakes and milk solids. The cereal flakes of this invention are the commonly found cereal flakes which preferably have not been substantially altered by chemical adulteration. The flaking of cereal is well known to the cereal industry and it is intended that this invention include cereal flakes made from processes well known, but which preferably do not include the addition of unnatural or chemical additives. Of particular importance in this invention are cereal flakes selected from the group comprising oat flakes, wheat flakes, barley flakes, and mixtures thereof. It has been found to be of particular desirability to utilize either oat flakes or a combination of oat flakes and wheat flakes in this invention.

The milk solids are milk solids which are well known to the industry but which are preferably free from chemical adulteration. Some amount of milk solids is important to the invention, and it is highly desirable that at least some amount of a milk solid be added. This contributes to the protein as well as provides some binding characteristics which are highly desirable. No more than about 10 parts by weight of the milk solids should be used in the product, however.

The base component preferably includes coconut and/or coconut flavor, preferably natural coconut flavor. The coconut of the present invention is preferably unprocessed except for comminution into a size desirable for addition into the product and is substantially free from known additives. The coconut flavor is flavoring essence derived from coconut and is preferably not subject to any chemical addition in its processing.

The base component also preferably includes edible nuts. Of particular importance in this invention as an edible nut are almonds. The almonds are subdivided or shredded to a small particle size for the inclusion in the product. The invention is not limited, however, to almonds, and other nuts could be used, even though they do not provide the exact characteristics of the almonds. For example, peanuts and pecans would likewise be acceptable, although not as the preferred embodiment of the invention.

The combination of the cereal flakes with the coconut and/or coconut flavor, milk solids and edible nuts provides the base component of the ready-to-eat cereal. This base component is coated or enrobed with a coating component which comprises the other ingredients.

Included in the coating component is sugar. As used herein, the term "sugar" is intended to mean an agent which imparts adhesion to the base component and incidentally imparts sweetness to the total cereal composition. Examples of "sugars" useful herein include, but are not limited to, sucrose, fructose, brown sugar, corn syrup, high fructose corn syrup, high maltose corn syrup, corn syrup solids, and mixtures thereof, with brown sugar being preferred. Preferably the sugar is substantially unrefined.

The coating component also includes a water-soluble dietary fiber composition which comprises a mixture of maltodextrin and beta-glucans at a ratio of maltodextrin to beta-glucans sufficient to impart softening and tenderizing properties to the ready-to-eat cereal product of the present invention, typically at a ratio of from about 1:1 to about 500:1, preferably from about 2:1 to about 20:1, more preferably from about 3:1 to about 15:1.

This maltodextrin and beta-glucans mixture may be obtained by any means known to those skilled in the art. For example, maltodextrin and beta-glucans may be obtained separately and then combined. In such a case, the beta-glucans may be in a purified form or may be in combination with other agents. As an example, cellulose gum contains beta-glucans and can be combined with the maltodextrin to prepare the water-soluble dietary fiber composition of the present invention.

The water-soluble dietary fiber composition may also be prepared by treating a processed beta-glucan containing grain with alpha-amylase to form a maltodextrin and beta-glucan containing mixture. In a preferred embodiment, the water-soluble dietary fiber composition is prepared by a method comprising treating an aqueous dispersion of a gelatinized, milled beta-glucan containing grain substrate with an alpha-amylase under conditions which will hydrolyze the substrate and yield a soluble fraction and an insoluble fraction; separating said soluble fraction from said insoluble fraction using any separation means known to those skilled in the art, with one or more centrifugation steps being preferred, a single centrifugation step being more preferred, and a single decanting step being most preferred; and recovering from said soluble fraction said water-soluble dietary fiber substantially free of water insoluble fiber, in accordance generally with the method described in U.S. Pat. No. 4,996,063, issued Feb. 26, 1991 to Inglett, the disclosure of which is incorporated herein by reference, or by any method providing an equivalent product. Examples of beta-glucan containing grain substrates include, but are not limited to, oat, rice and barley, with oat being preferred. For use in the present invention the alpha-amylase enzyme is preferably derived from natural sources such as *Bacillus stearothermophilus* and *Bacillus licheniformis*.

The coating component of the ready-to-eat cereal also includes a sugar solution. As used herein, the term "sugar solution" means a solution added to provide additional sweetness and flavor separate from the sugar compound of the coating component. The sugar solution is made from sugars, which preferably have been unprocessed, and/or else syrups, preferably natural. Included in this group are honey, which is preferred, molasses, maple syrup, and sucrose solutions, and mixtures thereof.

The coating component also contains a sufficient amount water to make the coating component liquid.

The ready-to-eat cereal product of the present invention may also include from about 5 parts to about 25 parts by weight dehydrated fruit. The dehydrated fruit is optional but is highly desirable and is a preferred embodiment of the present invention. Of particular desirability as a dehydrated fruit are raisins, dates and mixtures thereof. Whatever the dehydrated fruit, it is preferred that the fruit not have any chemical addition in the processing thereof, although it may be necessary to treat with a humectant to prevent excessive hardness.

The moisture content of the ready-to-eat cereal of the present invention is in the range of from about 1.0% to about 3.5%, preferably from about 2.0% to about 3.0% by weight when no fruit is added. If fruit, such as raisins and/or dates, is added, then the overall moisture content of the final product will be in the range of from about 1.0% to about 5.0%, preferably from about 2.0% to about 3.0% by weight. Substantial deviation from the specified moisture content will result in a product which is not desirable.

In a most preferred embodiment of the present invention, the ready-to-eat cereal as a whole, including the base and coating components, comprises from about 25 parts to about 40 parts, preferably from about 29 parts to about 37 parts by weight oat flakes, from about 8 parts to about 25 parts, preferably from about 15 parts to about 18 parts by weight wheat flakes, from about 1 part to about 6 parts, preferably from about 2 parts to about 3 parts by weight almonds, from about 3 parts to about 7 parts, preferably from about 5 parts to about 7 parts by weight coconut and/or from about 0.03 part to about 0.65 part, preferably from about 0.07 part to about 0.5 part by weight natural coconut flavor, from about 4 parts to about 8 parts, preferably from about 5 parts to about 7 parts by weight milk solids, from about 14 parts to about 20 parts, preferably from about 16 parts to about 18 parts by weight brown sugar, from about 1 part to about 5 parts, preferably from about 2 parts to about 3 parts by weight water-soluble dietary fiber, from about ¼ part to about 2½ parts by weight honey, from about 5 parts to about 13 parts by weight raisins, from about 5 parts to about 13 parts by weight dates, and sufficient water to make the coating component liquid.

The present invention further comprises a process for preparing a reduced fat, ready-to-eat cereal, said process comprising:
a. preparing a base component by admixing from about 30 parts to about 90 parts by weight cereal flakes with from 0 parts to about 10 parts by weight milk solids;
b. preparing a coating component by admixing from about 5 parts to about 60 parts by weight sugar, from about 1 part to about 10 parts by weight water-soluble dietary fiber composition, from about ½ part to about 5 parts by weight of a sugar solution, and sufficient water to make the coating component liquid;
c. heating the coating component to a temperature of from about 600° C. to about 700° C.;
d. enrobing the coating component onto the base component; and
e. drying the enrobed base component to below about 3.5 percent by weight moisture.

The base component in this process is preferably prepared by admixing from about 30 parts to about 90 parts, more preferably from about 50 parts to about 80 parts by weight cereal flakes with from about 5 parts to about 10 parts, more preferably from about 8 parts to about 10 parts by weight coconut and/or from about 0.05 part to about 1.0 part, more preferably from about 0.5 part to about 0.8 part by weight natural coconut flavor, from 0 parts to about 10 parts, more preferably from about 3 parts to about 9 parts by weight milk solids and from about 2 parts to about 9 parts, more preferably from about 3 parts to about 5 parts by weight edible nuts.

The definition of the cereal flakes, coconut, coconut flavor, milk solids, and edible nuts are as already described herein. These ingredients can be admixed simply by placing them in a tumbler and mixing them together.

The coating component is preferably prepared by admixing from about 5 parts to about 60 parts, more preferably from about 30 parts to about 50 parts by weight brown sugar, from about 1 part to about 10 parts, more preferably from about 4 parts to about 8 parts by weight water-soluble dietary fiber composition, from about ½ part to about 5 parts, more preferably from about 2 parts to about 4 parts by weight of a sugar solution, and sufficient water to make the coating component liquid.

After these ingredients are mixed, they are heated to a temperature of from about 600° C. to about 700° C., preferably from about 65° C. to about 70° C. It is significant that the temperature must be at a certain elevation in order to provide for proper heating, stickiness, and melting of the mixture. However, the temperature cannot be sufficiently high so as to cause degradation of the product. Therefore, it is necessary that the temperature range be somewhat closely controlled.

After the coating component is heated, it is enrobed onto the base component. This enrobing may be in a conventional cereal enrober.

After the coating component is enrobed onto the base component, the entire coated base component is then dried to a moisture content below about 3.5%, preferably about 2.5% by weight, leaving a product having a density in the range of from about 0.25 to about 0.60 gram per cubic centimeter.

If dehydrated fruit is to be included in the ready-to-eat cereal, then the dehydrated fruit is admixed with the dried enrobed base component and at that point from about 5 parts to about 25 parts by weight of the dehydrated fruits are added to the dried coated base component. The final moisture content of the product, including the fruit, must then fall within the range of from about 1.0% to about 5.0%, preferably from about 2.0% to about 3.0% by weight.

In a preferred embodiment, the process of the present invention comprises:
a. preparing a base component by admixing from about 30 parts to about 60 parts by weight oat flakes, from about 15 parts to about 40 parts by weight wheat flakes, f rom about 1 part to about 6 parts by weight almonds,, from about 5 parts to about 10 parts by weight coconut and/or from about 0.05 part to about 1. 0 part by weight natural coconut flavor, and from about 4 parts to about 8 parts by weight milk solids;
b. preparing a coating component by admixing from about 5 parts to about 60 parts by weight brown sugar, from about 1 part to about 10 parts by weight water-soluble dietary fiber composition, from about ½ part to about 5 parts by weight honey, and sufficient water to make the coating component liquid;

c. heating the coating component to a temperature of from about 60° C. to about 70° C.;

d. enrobing the coating component onto the base component; and e. drying the enrobed base component to below about 3.5 percent by weight moisture.

Of particular importance is the preferred embodiment of the process of the present invention wherein the enrobed base component is formed into a sheet, such as by depositing it on a moving belt, prior to drying and is then subdivided, preferably to an average particle size of about 0.8 centimeters, after drying. The resulting texture is excellent and the product is uniform in particle size and devoid of dust and fines which diminish acceptance.

The present invention is further illustrated, but not limited by, the following examples.

EXAMPLES

Example 1

A water-soluble, dietary fiber composition is prepared in accordance with the process as described in U.S. Pat. No. 4,996,063, issued Feb. 26, 1991 to Inglett, wherein a single decanting step is used to separate the soluble fiber and insoluble fiber in said process.

A cereal base component is then prepared by admixing 52 parts by weight oat flakes, 26 parts by weight wheat flakes, 4 parts by weight almonds, 10 parts by weight coconut, and 8 parts by weight non-fat dry milk solids. These ingredients are thoroughly admixed in a mixer. A coating syrup is prepared by admixing 47 parts by weight brown sugar with 6.4 parts by weight of the water-soluble dietary fiber composition, 3.6 parts by weight honey, and 4.3 parts by weight water. This coating component is mixed together and heated to a temperature of about 82° C. After the ingredients are thoroughly mixed at the temperature, the base component and coating component are placed in a cereal enrober and the coating component enrobed onto the cereal base component. The product is then dried in an oven to a moisture content of about 3 percent by weight. The drying is accomplished in an oven having inlet air temperatures of between 27° F., and 29° F., but the temperature of the cereal is never high enough to substantially degrade either the cereal base component or the coating component thereon. The product thus produced is a highly desirable ready-to-eat cereal product of natural ingredients unadulterated by chemical addition.

Example 2

Example 1 is repeated with the exception that: (1) 8.9 parts by weight of water-soluble dietary fiber composition in the form of a gel containing 25 grams water-soluble dietary fiber composition and 75 grams water is added to the coating syrup instead of dry water-soluble dietary fiber composition; and (2) 8.3 parts by weight water is added to prepare the coating syrup.

Example 3

Example 1 is repeated with the exception that the dried cereal product is admixed with 8.5 parts by weight raisins and 8.5 parts by weight dates. Again, the resulting product is a highly desirable, ready-to-eat cereal product.

What is claimed is:

1. A reduced fat, ready-to-eat cereal, said comprising: a base component and a coating component thereon, said base component comprising from about 30 parts to about 90 parts by weight cereal flakes and from 0 parts to about 10 parts by weight milk solids; said coating component comprising from about 5 parts to about 60 parts by weight sugar, from about a part to about 30 parts by weight water-soluble dietary fiber composition, from about ½ part to about 6 parts by weight of a sugar solution; and sufficient water to make the coating component liquid; wherein the water-soluble dietary fiber composition is prepared by treating an aqueous dispersion of a gelatinized, milled beta-glucan containing grain substrate with an alpha-amylase amylase under conditions which will hydrolyze the substrate and yield a soluble fraction and an insoluble fraction, separating said soluble fraction from said insoluble fraction, and recovering from said soluble fraction the water-soluble dietary fiber substantially free of water-insoluble fiber.

2. A ready-to-eat cereal product according to claim 1 wherein the water-soluble dietary fiber composition comprises maltodextrin and beta-glucans in a ratio in the range of from about 2:1 to about 15:1.

3. A ready-to-eat cereal product according to claim 2 wherein the soluble fraction is separated from the insoluble fraction with a single decanting step.

4. A ready-to-eat cereal product according to claim 1 wherein the base component further comprises from about 5 parts to about 10 parts by weight coconut and/or from about 0.05 part to about 1.0 part by weight natural coconut flavor, and from about 2 parts to about 9 parts by weight almonds.

5. A ready-to-eat cereal product according to claim 4 wherein the cereal flakes comprise a member selected from the group oat flakes, wheat flakes, barley flakes, and mixtures thereof, and the cereal has a density in the range of from about 0.25 to about 0.60 gram per cubic centimeter and a moisture content in the range of from about 1.0 to about 3.5 percent by weight moisture.

6. A ready-to-eat cereal product according to claim 5 wherein the sugar solution is selected from the group comprising honey, molasses, maple syrup, and sucrose solutions.

7. A ready-to-eat cereal product according to claim 4 which also contains from about 5 parts to about 25 parts by weight dehydrated fruit and which has an overall moisture content in the range of from about 1.0 to about 5.0 percent by weight.

8. A ready-to-eat cereal product according to claim 7 wherein the dehydrated fruit is selected from the group comprising raisins, dates, and mixtures thereof.

9. A ready-to-eat cereal product according to claim 8 wherein the base component comprises from about 0.05 part to about 1.0 part by weight natural coconut flavor.

10. A reduced fat, ready-to-eat cereal, said cereal comprising from about 29 parts to about 37 parts by weight oat flakes, from about 15 parts to about 18 parts by weight wheat flakes, from about 2 parts by about 3 parts by weight almonds, from about 5 parts to about 7 parts by weight coconut and/or from about 0.07 part to about 0.5 part by weight natural coconut flavor, from about 5 parts to about 7 parts by weight milk solids, from about 16 parts to about 18 parts by weight brown sugar, from about 2 parts to about 3 parts by weight water-soluble dietary fiber composition, from about ¼ part to about 2½ parts by weight honey, sufficient water to make the coating component liquid, from about 5 parts to about 13 parts by weight raisins, from about 5 parts to about 13 parts by weight dates, and has a density in the range of from about 0.25 to about 0.60 gram per cubic centimeter and a moisture content in the range of from about 1.0 to about 5.0 percent by weight; wherein the water-soluble dietary fiber composition is prepared by treating an aqueous dispersion of a gelatinized, milled beta-glucan containing grain substrate with an alpha-amylase under conditions which will hydrolyze the substrate and yield a soluble fraction and an insoluble fraction, separating said soluble fraction from said insoluble fraction, and recovering from said soluble fraction the water-soluble dietary fiber substantially free of water-insoluble fiber.

11. A ready-to-eat cereal product according to claim 10 wherein the water-soluble dietary fiber composition comprises maltodextrin and beta-glucans in a ratio in the range of from about 3:1 to about 15:1.

12. A process for preparing a reduced fat, ready-to-eat cereal, said process comprising:
  (a) preparing a base component by admixing from about 30 parts to about 90 parts by weight cereal flakes with from 0 parts to about 10 parts by weight milk solids;
  (b) preparing a coating component by admixing from about 5 parts to about 60 parts by weight sugar, from about 1 part to about 10 parts by weight water-soluble dietary fiber composition, from about ½ part to about 5 parts by weight of a sugar solution, and sufficient water to make the coating component liquid;
  (c) heating the coating component to a temperature of from about 600° C. to about 700° C.;
  (d) enrobing the coating component onto the base component; and
  (e) drying the enrobed base component to below about 3.5 percent by weight moisture.

13. A process according to claim 12 wherein the water-soluble dietary fiber composition comprises maltodextrin and beta-glucans in a ratio in the range of from about 3:1 to about 15:1.

14. A process according to claim 12 wherein the water-soluble dietary fiber composition is prepared by a method comprising treating an aqueous dispersion of a gelatinized, milled beta-glucan containing grain substrate with an alpha-amylase under conditions which will hydrolyze the substrate and yield a soluble fraction and an insoluble fraction, separating said soluble fraction from said insoluble fraction, and recovering from said soluble fraction said water-soluble dietary fiber substantially free of water-insoluble fiber.

15. A process according to claim 14 wherein the soluble fraction is separated from the insoluble fraction with a single decanting step.

16. A process for preparing a reduced fat, ready-to-eat cereal, said process comprising:
  (a) preparing a base component by admixing from about 30 parts to about 60 parts by weight oat flakes, from about 15 parts to about 40 parts by weight wheat flakes, from about 1 parts to about 6 parts by weight almonds, from about 5 parts to about 10 parts by weight coconut and/or from about 0.05 part to about 1.0 part by weight natural coconut flavor, and from about 4 parts to about 8 parts by weight milk solids;
  (b) preparing a coating component by admixing from about 5 parts to about 60 parts by weight brown sugar, from about 1 part to about 10 parts by weight water-soluble dietary fiber composition, from about ½ part to about 5 parts by weight honey, and sufficient water to make the coating component liquid, wherein the water-soluble dietary fiber composition is prepared by a method comprising treating an aqueous dispersion of a gelatinized, milled beta-glucan containing grain substrate with an alpha-amylase under conditions which will hydrolyze the substrate and yield a soluble fraction and an insoluble fraction, separating said soluble fraction from said insoluble fraction i a single decanting step, and recovering from said soluble fraction said water-soluble dietary fiber substantially free of water-insoluble fiber;
  (c) heating the coating component to a temperature of from about 60° C. to about 70° C.;
  (d) enrobing the coating component onto the base component; and
  (e) drying the enrobed base component to below about 3.5 percent by weight moisture;
wherein the cereal has a density in the range of from about 0.25 to about 0.60 gram per cubic centimeter.

17. A process according to claim 16 wherein the water-soluble dietary fiber composition comprises maltodextrin and beta-glucans in a ratio in the range of from about 3:1 to about 15:1.

18. A process according to claim 17 wherein the dried, enrobed based component is admixed with from 5 parts to 25 parts by weight dehydrated fruit selected from the group comprising raisins, dates, and mixtures thereof, and the overall moisture content of the final product then falls within the range of from about 1.0 to about 5.0 percent by weight.

19. A process for preparing a reduced fat, ready-to-eat cereal, said process comprising:
  (a) preparing a base component by admixing from about 30 parts to about 60 parts by weight oat flakes, from about 15 parts to about 40 parts by weight wheat flakes, from about 1 parts to about 6 parts by weight almonds, from about 5 parts to about 10 parts by weight coconut and/or from about 0.05 part to about 1.0 part by weight natural coconut flavor, and from about 4 parts to about 8 parts by weight milk solids;
  (b) preparing a coasting component by admixing from about 5 parts to about 60 parts by weight brown sugar, from about 1 part to about 10 parts by weight water-soluble dietary fiber composition, from about ½ to about 5 parts by weight honey, and sufficient water to make the coating component liquid, wherein the water-soluble dietary fiber composition is prepared by a method comprising treating an aqueous dispersion of a gelatinized, milled oat substrate with an alpha-amylase under conditions which will hydrolyze the substrate and yield a soluble fraction and an insoluble fraction, separating said soluble fraction from said insoluble fraction, and recovering from said soluble fraction said water-soluble dietary fiber substantially free of water-insoluble fiber;
  (c) heating the coating component to a temperature of from about 60° C. to about 70° C.;
  (e) enrobing the coating component onto the base component;
  (e) forming the enrobed base component into a sheet;
  (f) drying the enrobed base component to below about 3.5 percent by weight moisture; and
  (g) subdividing the dried sheet.

20. A process according to claim 19 wherein the water-soluble dietary fiber composition comprises maltodextrin and beta-glucans in a ratio in the range of from about 3:1 to about 15:1.

21. A process according to claim 19 wherein the soluble fraction is separated from the insoluble fraction with a single decanting step.

22. A process according to claim 19 wherein the subdivision comprises a particle size reduction having the average particle size is about 0.8 centimeters, and wherein the cereal product has a density in the range of from about 0.25 to about 0.60 gram per cubic centimeter.

23. A process according to claim 22 wherein the dried, enrobed base component is admixed with from 5 parts to 25 parts by weight dehydrated fruit selected from the group comprising raisins, dates, and mixtures thereof, and the overall moisture content of the final product then falls within the range of from about 1.0 to about 5.0 percent by weight.

* * * * *